(12) United States Patent
Kashi et al.

(10) Patent No.: US 10,037,702 B1
(45) Date of Patent: Jul. 31, 2018

(54) SYSTEM AND METHOD FOR PROVIDING VISUALIZATION AIDS FOR EFFECTIVE INTERVAL MANAGEMENT PROCEDURE EXECUTION

(71) Applicant: HONEYWELL INTERNATIONAL INC., Morris Plains, NJ (US)

(72) Inventors: Rajanikanth Nagaraj Kashi, Karnataka (IN); Vinayak Manohar Chitragar, Karnataka (IN); Sathish Pakki, Karnataka (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 15/653,838

(22) Filed: Jul. 19, 2017

(51) Int. Cl.
| | |
|---|---|
| G08G 5/00 | (2006.01) |
| G06T 13/80 | (2011.01) |
| G10L 15/26 | (2006.01) |
| G06F 17/27 | (2006.01) |
| G06T 11/00 | (2006.01) |
| G06T 11/20 | (2006.01) |
| G06F 3/0484 | (2013.01) |

(52) U.S. Cl.
CPC ........... G08G 5/0021 (2013.01); G06T 13/80 (2013.01); G08G 5/0013 (2013.01); G08G 5/0039 (2013.01); G08G 5/0047 (2013.01); G08G 5/0082 (2013.01); G10L 15/265 (2013.01); *G06F 3/04842* (2013.01); *G06F 17/2705* (2013.01); *G06F 2203/04806* (2013.01); *G06T 11/001* (2013.01); *G06T 11/206* (2013.01)

(58) Field of Classification Search
CPC .... G06T 13/80; G06T 17/2705; G10L 15/265

USPC .......................................................... 701/14
See application file for complete search history.

(56) References Cited

U.S. PATENT DOCUMENTS

| | | |
|---|---|---|
| 6,393,358 B1 | 5/2002 | Erzberger et al. |
| 7,412,324 B1 | 8/2008 | Bagge et al. |
| 8,203,465 B2 | 6/2012 | Shafaat et al. |
| 8,290,696 B1 | 10/2012 | Sridhar et al. |

(Continued)

FOREIGN PATENT DOCUMENTS

| | | |
|---|---|---|
| CN | 105096661 A | 11/2015 |
| EP | 3032518 A2 | 6/2016 |

OTHER PUBLICATIONS

Stassen, H., et al.; Multi-Purpose Cockpit Display of Traffic Information: Overview and Development of Performance Requirements; American Institute of Aeronautics and Astronautics; 2010.

Primary Examiner — Tan Q Nguyen
(74) Attorney, Agent, or Firm — Lorenz & Kopf, LLP

(57) ABSTRACT

Methods and apparatus are provided for simulating an interval management (IM) procedure for an ownship aircraft and a target aircraft before the start of the performance of the IM procedure. The method comprises receiving an IM clearance message from air traffic control (ATC), parsing the received IM clearance message into parsed information components identifying the complexity of the IM clearance message based on the number of elements in the information components, generating a flight chart depicting the area over which the proposed IM procedure is to traverse using the mapping information wherein the flight chart includes a vertical view and a plan view, and simulating the IM procedure on the generated flight chart before any steps of the IM procedure are performed.

20 Claims, 9 Drawing Sheets

(56) References Cited

U.S. PATENT DOCUMENTS

| | | |
|---|---|---|
| 8,386,100 B1 | 2/2013 | Lie |
| 8,577,587 B2 | 11/2013 | Weitz et al. |
| 8,629,787 B1 | 1/2014 | Rathinam et al. |
| 8,781,649 B2 | 7/2014 | Kar et al. |
| 9,142,133 B2 | 9/2015 | Palanisamy et al. |
| 9,171,472 B2 | 10/2015 | Scheu et al. |
| 9,465,097 B2 | 10/2016 | Stayton et al. |
| 2010/0027768 A1 | 2/2010 | Foskett |
| 2012/0310450 A1* | 12/2012 | Srivastav ............ G08G 5/0021 701/3 |
| 2014/0249701 A1 | 9/2014 | Latsu-Dake et al. |
| 2014/0249737 A1 | 9/2014 | Meunier et al. |
| 2014/0320332 A1 | 10/2014 | Stayton et al. |
| 2016/0140855 A1* | 5/2016 | Gannon ................ G08G 5/065 701/533 |
| 2017/0154537 A1* | 6/2017 | Moravek ............. G08G 5/0056 |

\* cited by examiner

SYSTEM AND METHOD FOR PROVIDING VISUALIZATION AIDS FOR EFFECTIVE INTERVAL MANAGEMENT PROCEDURE EXECUTION

STATEMENT REGARDING FEDERALLY SPONSORED RESEARCH OR DEVELOPMENT

This invention was made with Government support under contract number NNL13AA03B awarded by NASA Langley Research Center. The Government has certain rights in this invention.

TECHNICAL FIELD

The technology described in this patent document relates generally to interval management and more particularly to a preview of interval management operations.

BACKGROUND

Managing the spacing intervals between aircraft in traffic flows (e.g., interval management) can allow for a greater number of aircraft in the traffic flows and can provide increased delivery accuracy for aircraft arrivals. Interval management (IM) involves air traffic control (ATC) inducting an aircraft into an arrival queue and assigning a spacing goal for the aircraft through an IM clearance message. The flight crew (e.g., pilot) checks for the feasibility of meeting the assigned spacing goal in the IM clearance message, communicates to the ATC an acceptance or rejection of the assigned spacing goal, and if accepted enters the clearance information from the IM clearance message into a computer which provides speed guidance commands to execute IM operations.

As the complexity of the IM clearance messages increases, responding to the IM clearance messages may become more difficult for a flight crew. The flight crew should process the entire IM operation correctly before accepting or declining the IM clearance message. Complex IM clearance messages may take more time to correctly process.

Accordingly, it is desirable to provide a system for assisting a flight crew in evaluating moderate to higher complexity IM clearances correctly. Furthermore, other desirable features and characteristics of the present invention will become apparent from the subsequent detailed description of the invention and the appended claims, taken in conjunction with the accompanying drawings and the background of the invention.

SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A method of simulating an interval management (IM) procedure for an ownship aircraft and a target aircraft before the start of the performance of the IM procedure is provided. In one embodiment, the method comprises receiving an IM clearance message from air traffic control (ATC), parsing the received IM clearance message into parsed information components comprising mapping information identifying the area over which the IM procedure is to traverse, flight information for the ownship aircraft and the target aircraft for the IM procedure that includes the intended flight path and current speeds for each of the ownship aircraft and the target aircraft, and maneuver information that identifies one or more maneuver types to be made by the ownship aircraft to execute the proposed IM procedure. The method further comprises identifying the complexity of the IM clearance message based on the number of elements in the information components, generating a flight chart depicting the area over which the proposed IM procedure is to traverse using the mapping information wherein the flight chart includes a vertical view and a plan view, and simulating the IM procedure on the generated flight chart before any steps of the IM procedure are performed. Simulating the IM procedure comprises positioning the ownship aircraft and the target aircraft at a starting point in an animation of the flight chart using the flight information, decoding the merge point in the animation of the movement of the ownship aircraft and the target aircraft on the flight chart using the maneuver information, generating vertical path display information for both the ownship aircraft and the target aircraft on the vertical view of the flight chart, and animating the movement of the ownship aircraft and the target aircraft in the animation on both the elevation and plan views of the flight chart. The method further comprises displaying the animation on both the plan and elevation views to the flight crew.

An interval management (IM) clearance system configured to aid a flight crew on an ownship aircraft in deciding whether to accept or reject an IM clearance message by providing an animation of an IM procedure for the ownship aircraft and a target aircraft identified in the IM clearance message that the ownship aircraft is to follow during the execution of the IM procedure is provided. In one embodiment, the system comprises a receiver in the ownship aircraft configured to receive an IM clearance message and a parser configured to parse the received IM clearance message into parsed information components. The parsed information components comprise mapping information identifying the area over which the IM procedure is to traverse, flight information for the ownship aircraft and the target aircraft for the IM procedure that includes the intended flight path and current speeds for each of the ownship aircraft and the target aircraft, and maneuver information that identifies one or more maneuver types to be made by the ownship aircraft to execute the proposed IM procedure. The system further comprises a flight chart generator configured to receive the mapping information and based on the received mapping information generate a flight chart depicting the area over which the proposed IM procedure is to traverse using the mapping information wherein the flight chart includes a vertical view and a plan view. The system further comprises a flight path renderer configured to position the ownship aircraft and the target aircraft at a starting point in an animation of the flight chart using the flight information, a merge type evaluator configured to decode the merge point in the animation of the movement of the ownship aircraft and the target aircraft on the flight chart using the maneuver information, a vertical situation view generator configured to generate vertical path display information for both the ownship aircraft and the target aircraft on the vertical view of the flight chart, an IM procedure animator configured to animate the movement of the ownship aircraft and the target aircraft in the animation on both the elevation and plan views of the flight chart, and a display system configured to display the animation on both the plan and elevation views to the flight crew.

BRIEF DESCRIPTION OF THE DRAWINGS

Aspects of the present disclosure are best understood from the following detailed description when read with the accompanying figures, wherein like numerals denote like elements, and wherein.

DETAILED DESCRIPTION

Figure 1:
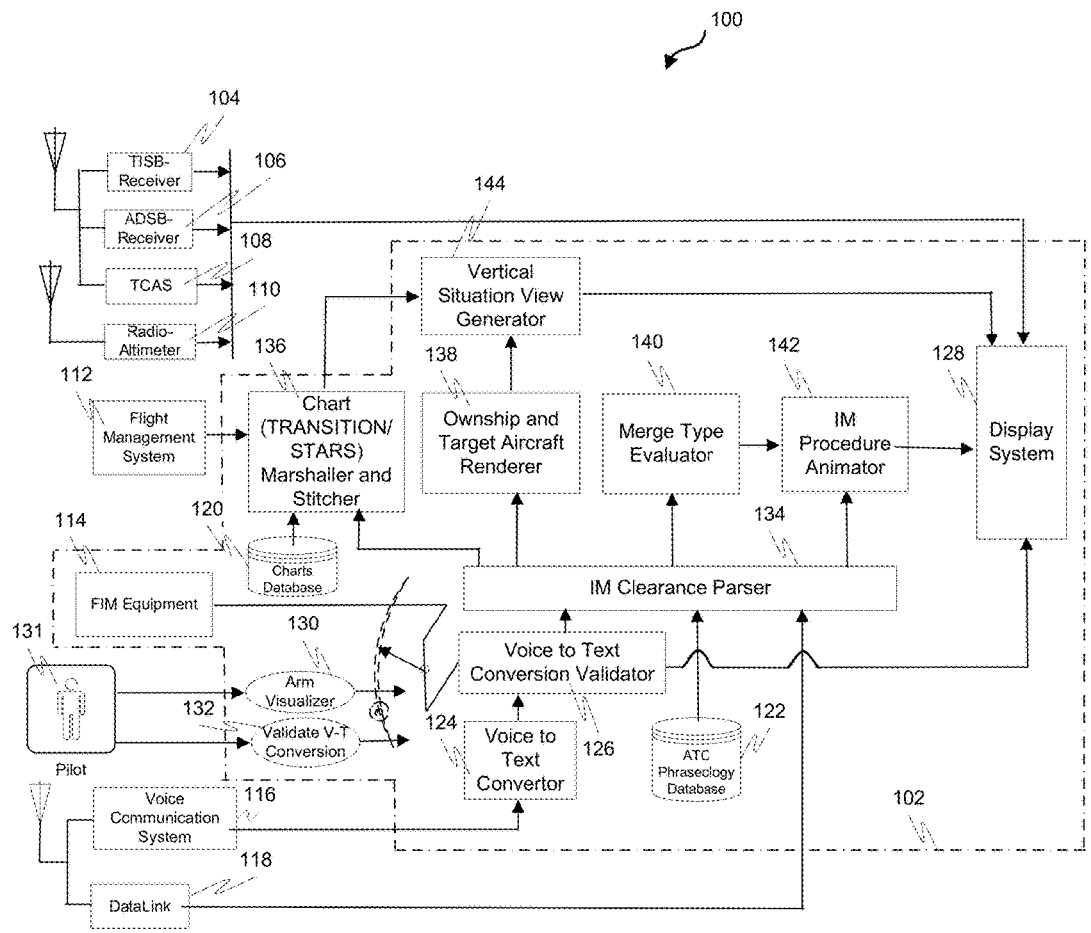
FIG. 1 is a block diagram depicting example aircraft equipment that may be accessible to the flight crew, in accordance with some embodiments.

The subject matter described herein discloses apparatus, systems, techniques and articles for processing interval management (IM) clearance messages and providing a simulation of the proposed IM procedure for a flight crew to consider before the flight crew responds with an acceptance or rejection of the IM clearance message. The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, summary, or the following detailed description.

Air traffic control (ATC) may issue an IM clearance message to the flight crew (e.g., the pilot) of an ownship aircraft, which may among other things identify the trajectory the ownship aircraft should fly, an aircraft ahead of the ownship aircraft (i.e., the target aircraft), a merge point at which the ownship aircraft should merge into a path following the target aircraft, and a desired spacing between the ownship aircraft and the target aircraft while the ownship aircraft follows the target aircraft down the path. If the IM procedure identified in the IM clearance message is accepted and followed, the ownship flight crew can manage spacing through speed adjustments generated by onboard flight deck-based interval management (FIM) equipment until reaching a planned termination point. Interval management spacing (IM-S) may be implemented, for example, during the arrival and approach phases of flight.

The IM clearance messages may be classified into "Lower", "Moderate", or "Higher" IM clearance complexity. The lower complexity messages may possess about 'X' (e.g., 6) elements while the Moderate and Higher complexity messages may possess about 'Y' (e.g., 7) and 'Z' (e.g.,10) elements, respectively. Also, some of the merging and spacing operations may be complex (e.g., IM turn). Using this complexity (whenever Y elements or Z elements are encountered [or configurable]), an option may be provided to alert the pilot that this IM clearance message can be previewed with the animation feature.

The moderate and higher complexity messages may be more difficult for the flight crew of the ownship aircraft to process before communicating an accept or reject decision to ATC. To aid the flight crew in the decision-making process, the apparatus, systems, techniques and articles described herein provide a preview-like animated display that can extract the IM clearance data semantically in the case of a voice message, overlay a predicted ownship and target aircraft on transition/terminal area charts displayed on plan and vertical displays, and simulate the movement of the ownship and the target in accordance with the information contained in the IM clearance message.

FIG. 1 is a block diagram depicting example aircraft equipment 100 that may be accessible to the flight crew. The example equipment 100 includes an example interval management clearance evaluator (IMClear) system 102. The example IMClear system 102 is configured to provide a quick evaluation of the IM clearance message that a flight crew initially obtains at the start of an IM Procedure. In one embodiment, the system 102 may be made available as an option that may be selectable from a bezel switch alongside an already available aircraft display system.

The example aircraft equipment 100 includes a traffic information service-broadcast (TIS-B) receiver 104, an automatic dependent surveillance-broadcast (ADS-B) receiver 106, a traffic collision avoidance system or traffic alert and collision avoidance system (both abbreviated as TCAS) receiver 108, and a radio altimeter 110, all of which may provide output to be displayed on a cockpit display system 128. The example aircraft equipment 100 also includes a flight management system (FMS) 112 for facilitating in-flight management of the aircraft flight plan and flight deck interval management (FIM) equipment 114. The example aircraft equipment 100 further includes a voice communication system 116 for communicating via voice with air traffic control (ATC), a data link 118 for communicating via text with ATC, an aeronautical charts database 120, and an aeronautical phraseology database 122 (containing a set of communication rules for simplified English language communication between ATC and the flight crew). In this example, the datalink system 118 includes a digital controller-pilot data link communications (CPDLC) system that may be in place for IM operations.

The example IMClear system 102 includes a voice to text converter 124 for processing an IM clearance message received from air traffic control (ATC) via the voice communication system 116 and converting the IM message from a message in voice form to a message in text form, a voice to text conversion validator 126 that displays the voice to text conversion on the display system 128 and allows the flight crew (e.g., a pilot 131) to validate and/or correct the voice to text conversion, an arm visualizer switch 130 which flight crew can use to allow the IMClear system 102 to show a text view of a received IM message on the display system 128, and a validate voice-to-text conversion switch 132 that the flight crew can use to validate the voice to text conversion of a received IM message. The converted and validated IM clearance message may be subsequently passed to an IM Clearance Parser 134. The voice to text conversion validator 126 is provided in this example because in some applications the hit rate success of automated speech to text conversion may be about 80 percent.

The example IM clearance parser 134 is configured to parse the text version of the IM message. The example IM clearance parser 134 can receive the IM message directly as text from the datalink 118 or from the voice to text conversion validator 126. Three distinct categories of information can be extracted through the parsing process: (a) information about the transitions and terminal area charts that are relevant for the IM procedure; (b) ownship and target aircraft information used for simulation such as intended flight path, current speeds, and required time of arrival/estimated time of arrival (RTA/ETA), if available; and (c) merge type information such as maintain current spacing, capture then maintain, achieve-by then maintain, final approach spacing, IM turn, intercept point, and termination point. The extracted information in the example IMClear system 102 is provided to a chart marshaller and stitcher 136, an ownship and target aircraft render 138, a merge type evaluator 140, and an IM procedure animator 142.

The example chart marshaller and stitcher 136 is configured to retrieve transition and/or standard terminal arrival route (STAR) charts from the charts database 120 that are relevant to the IM procedure and weaves together the charts, if multiple charts are involved. The example ownship and target aircraft render 138 is configured to position the ownship and IM Target aircraft along their courses for start of the animation. The example merge type evaluator 140 is configured to decode the actual merge point on the routes. The example IM procedure animator 142 is configured to move the ownship and the target aircraft along the route tracks on both the elevation and plan views.

A vertical situation view generator 144 is also provided in the example IMClear system 102 and is configured to handle cases where the ownship and the target aircraft are at different altitudes for parts of their route and to also handle cases of approach along optimal profile descents (OPDs). Output from the chart marshaller and stitcher 136 and from the ownship and target aircraft renderer is also provided to the vertical situation view generator 144, which in turn generates vertical path display information for both ownship and IM target aircraft.

The example voice to text converter 124, example voice to text conversion validator 126, example IM clearance parser 134, example chart marshaller and stitcher 136, example ownship and target aircraft render 138, example merge type evaluator 140, example IM procedure animator 142, and example vertical situation view generator 144 may be implemented by aircraft computer equipment comprising one or more processors and programming instructions encoded on non-transient computer readable media. The programming instructions that when executed by the one or more processors may cause the example IMClear system 102 to perform the functions attributed to each of its functional elements.

The example display system 128 may include one or more displays and may be configured, among other things, to display the elevation and plan view of the charts generated by the example IMClear system 102, the animation of the IM procedure for the ownship and target aircraft, and output from the TIS-B receiver 104, the ADS-B receiver 106, the TCAS receiver 108, and the radio altimeter 110.

Simulated flight information displayed on the display system may in some examples provide an option to include wind profile data. The wind profile data can be obtained from Global Data Center operations or Weather data sources. In some examples, displaying the animation may comprise displaying the animation with options to zoom-in and zoom-out into individual flight legs to obtain more information on speed, altitude, or time restrictions. In some examples, displaying the animation may comprise displaying the animation with an option for color coding based on the speed gradient, the number of speed commands, the extent of deceleration and the extent of acceleration. In some examples, an option to select the plan and vertical views are provided. In some examples, an option to re-review the IM clearance at any time is provided.

Figure 2:
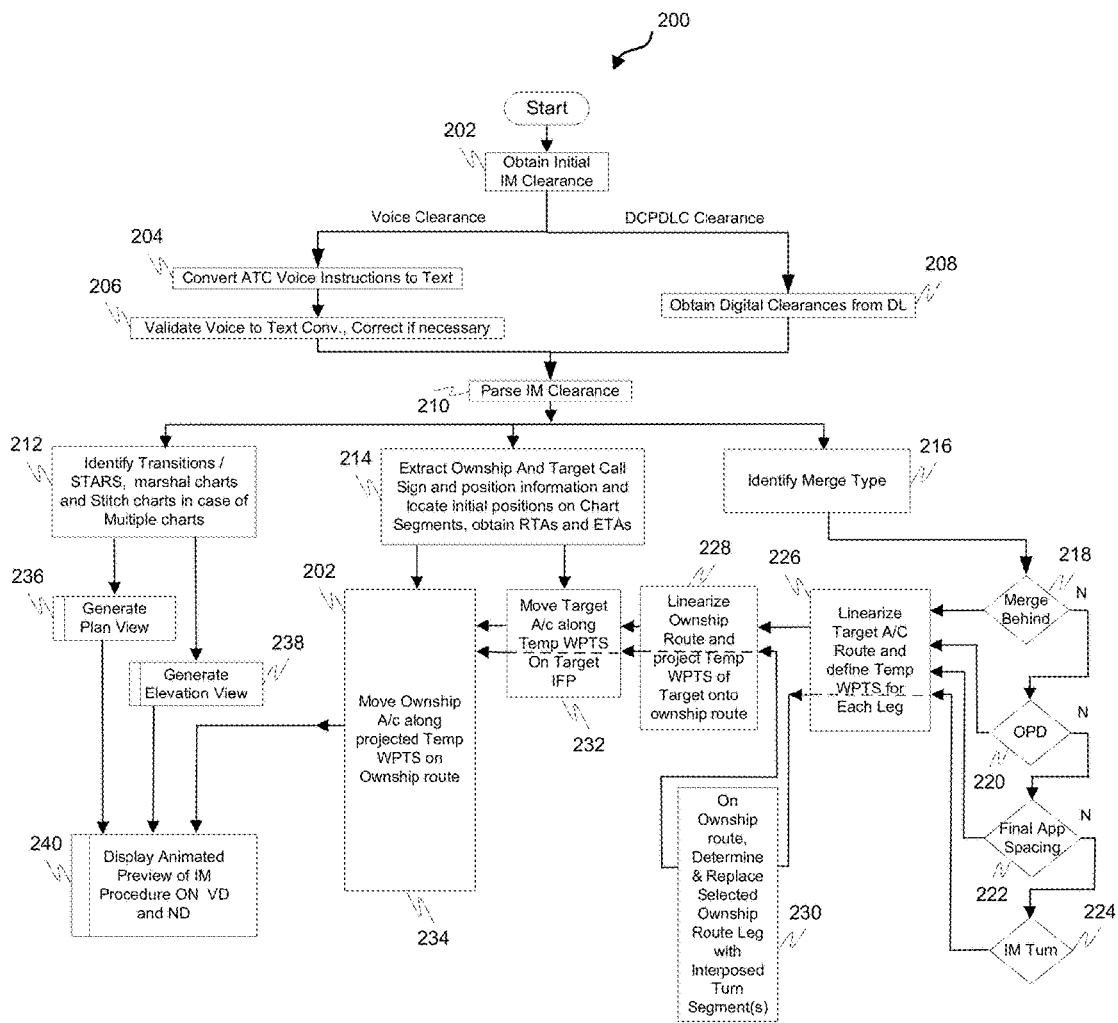
FIG. 2 is a process flowchart depicting an example process in an example IM clearance system for providing an animation of a proposed IM sequence to a flight crew, in accordance with some embodiments.

FIG. 2 is a process flowchart depicting an example process 200 in an example IM clearance system for providing an animation of a proposed IM sequence to a flight crew. When the IMClear function is initiated, initial IM clearance information is obtained via either a voice communication link or a datalink system (operation 202).

When the IM clearance message is obtained from a voice communication system, the voice instructions (e.g., IM clearance message) from ATC is converted to text instructions (operation 204) and the converted text is validated and corrected if necessary (operation 206). The converted text can be displayed on a display device and the flight crew can be provided an opportunity to review and correct the converted text displayed on the display device. The IM clearance message may also be a digital clearance message obtained through the datalink system (operation 208).

The IM clearance information, the converted text or the digital clearance information from the data link, is parsed (operation 210). Three distinct categories of information can be extracted through the parsing operations: (a) information regarding the transitions and terminal area charts that are relevant for the IM procedure; (b) ownship and target IM aircraft information to be used for generating a simulation such as intended flight path, current speeds, and requested time of arrival/estimated time of arrival (RTA/ETA), if available; and (c) merge type information (e.g. IM clearance type) that identifies how the interval management is to be achieved such as maintain current spacing, capture then maintain, achieve-by then maintain, final approach spacing, and IM turn.

The first category of information is used to identify transitions/STAR charts relevant to the IM procedure, and the relevant charts are marshalled and stitched together to create a chart that covers the areas involved in the IM procedure (operation 212). The second category of information is used to position the ownship and IM Target aircraft along their courses for start of the animation. This involves extracting ownship and target call sign and position information, locating initial positions on chart segments, and obtaining RTAs and ETAs (operation 214).

The third category of information is partly extracted during the parsing operations and subsequently the actual merge point on the routes are decoded (operation 216). The decoding of the actual merge points is performed to allow for the correct depiction of the IM operations. For example, in some cases like IM Turns, the maneuvers are not simple and there may be multiple points on the ownship route where a turn (to the Intercept point) may be possible.

When the merge type involves a merge behind maneuver (yes at decision 218), an OPD maneuver (yes at decision 220), a final approach spacing maneuver (yes at decision 222), or an IM turn maneuver (yes at decision 224), the target aircraft's route is linearized and temporary waypoints are defined for each leg of the target aircraft's route (operation 226). The ownship's route is also linearized and the temporary waypoints defined for each leg of the target aircraft's route are projected onto the ownship's linearized route (operation 228). The linearization of the routes of the target and ownship aircrafts and the provision of temporary waypoints can provide a way for the system to systematically step the target and ownship along their respective flight paths in increments shorter than distance between flight path legs.

When the merge type involves an IM turn maneuver (yes at decision 224), the example process also involves determining and replacing, on the ownship route, selected ownship route legs with interposed turn segments (operation 230). The actual ownship route leg in which the IM turn segment is to be implemented may not be specified in the IM message and a determination is made regarding the leg into which the IM turn should be incorporated for purposes of the simulation.

The extracted target call sign and position information, initial position on chart segments, and information regarding RTAs and ETAs along with the linearized target aircraft route are used to move the target aircraft from one temporary waypoint to another on the target aircraft's initial flight plan in the simulation (operation 232). Similarly, the extracted ownship call sign and position information, initial position on chart segments, and information regarding RTAs and ETAs along with the linearized ownship route are used to move the ownship aircraft from one projected temporary waypoint to another on the ownship aircraft's route in the simulation (operation 234).

A plan view is generated from the created chart that covers the areas involved in the IM procedure (operation 236). Also, an elevation view is generated from the created chart that covers the areas involved in the IM procedure (operation 238).

The generated simulated ownship movement and the generated simulated target aircraft movement is projected onto the generated plan view and the generated elevation view to display an animated preview of the IM procedure on a display system (e.g., including a vertical display and a normal display) for viewing by the flight crew (operation 240).

The simulated flight information displayed on the display system may in some examples provide an option to include wind profile data. The wind profile data can be obtained from Global Data Center operations or Weather data sources. In some examples, displaying the animation may comprise displaying the animation with options to zoom-in and zoom-out into individual flight legs to obtain more information on speed, altitude, or time restrictions. In some examples, displaying the animation may comprise displaying the animation with an option for color coding based on the speed gradient, the number of speed commands, the extent of deceleration and the extent of acceleration. One exemplar method to color code the speed gradients is to use the information "AccumulatedPercentOwnshipError" from the example algorithm for simulating the movement of the ownship during an IM procedure and the rate of change of that parameter discussed below.

Figure 3:
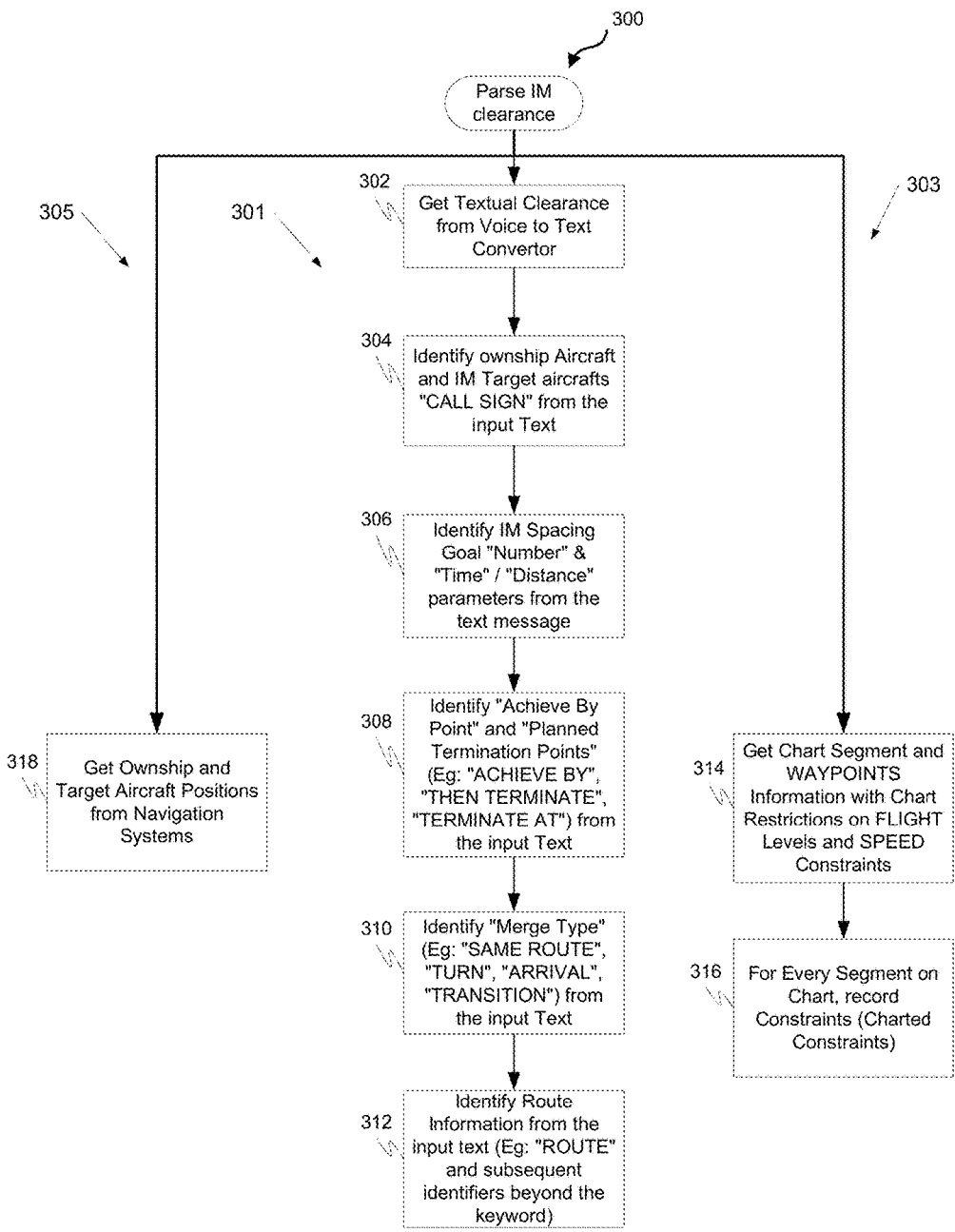
FIG. 3 is a process flowchart depicting an example process for parsing IM clearance information from an IM message, in accordance with some embodiments.

FIG. 3 is a process flowchart depicting an example process 300 for parsing IM clearance information from an IM message and can provide an example of the parse IM clearance operations 210 of example process 200. The example process 300 includes three branches, an IM clearance information process branch 301, a chart information processing branch 303, and an ownship and target aircraft information processing branch 305.

In the example IM clearance information process branch 301, textual clearance information is retrieved from a voice to text convertor (operation 302). Using, for example, a ATC phraseology database, a number of parameters are identified from the textual clearance information. Ownship aircraft and target aircraft call signs are identified from the textual clearance information (operation 304). Various IM spacing goal parameters (e.g., number and time or distance are identified from the textual clearance information. (operation 306). The achieve by point and planned termination point (e.g., "ACHIEVE BY", "THEN TERMINATE", "TERMINATE AT") are identified from the textual clearance information (operation 308). Merge type parameters (e.g., "SAME ROUTE", "TURN", "ARRIVAL", "TRANSITION") are identified from the textual clearance information (operation 310). Also, route information (e.g., "ROUTE" and subsequent identifiers beyond the keyword) are identified from the textual clearance information (operation 312).

In the example chart information processing branch 303, chart segment and waypoint information with chart restrictions on flight levels and speed constraints are retrieved (operation 314). The constraints for every chart segment is recorded (operation 316). In the example ownship and target aircraft information processing branch 305, ownship and target aircraft positions from navigation systems are obtained (operation 318).

Figure 4:
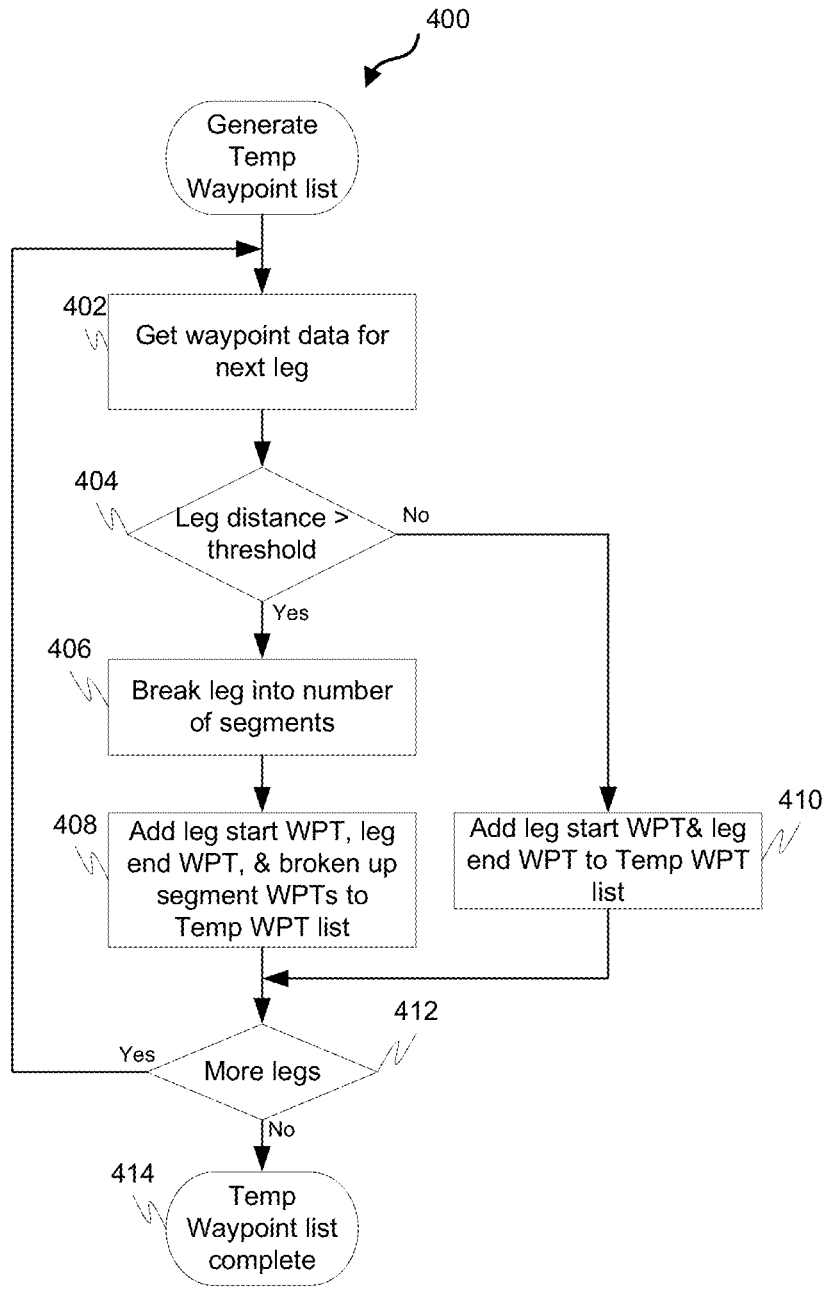
FIG. 4 is a process flowchart depicting an example process for defining temporary waypoints for each leg of a target aircraft flight path, in accordance with some embodiments.

FIG. 4 is a process flowchart depicting an example process 400 for defining temporary waypoints for each leg of a target aircraft flight path and can provide an example of the define temporary waypoints for each leg operations 226 of example process 200. The example process 400 includes obtaining waypoint data for the next leg (operation 402). A decision is made regarding whether the leg should be broken up into smaller segments (decision 404). If the leg distance is greater than a predetermined threshold level (yes at decision 404), the leg is broken in a number of segments (operation 406). The leg starting waypoint, the leg ending waypoint, and the waypoints of the segments are added to a temporary waypoint list (operation 408). If the leg distance was not greater than the predetermined threshold level (no at decision 404), the leg is not broken in a number of segments and the leg starting waypoint and ending waypoint are added to the temporary waypoint list (operation 410). After waypoints have been added to the temporary list, a determination is made regarding whether additional legs exist (decision 412). If additional legs exist (yes at decision 412), the example process 400 continues with obtaining waypoint data for the next leg (operation 402). If additional legs do not exist (no at decision 412), the example process 400 concludes with a completed temporary waypoint list (operation 414).

Listed below is an example algorithm for Defining Temp-WPTS for Each Leg:

```
For Target Aircraft, Get Total Number of Legs before
    Achieve-By-Point from the STARS Chart
Set LegToWaypointsBreakUpThreshold=X Miles
Set NumberOfSubsegments=Y (Integer)
Set NumberOfTempWaypoints=0
Set TempWPTList=[ ]
For Each Leg of Target Aircraft Route
{ if Leg Distance>LegToWaypointsBreakUpThreshold then
    {
    Store Leg Start WPT, Leg End WPT
    Break Leg into NumberOfSubsegments
    Compute coordinates for WPTS obtained for the bro-
        ken up NumberOfSubsegments
        ADD Leg Start WPT, Leg End WPT and Broken up
            Segment WPTS to TempWPTList
        Update NumberOfTempWaypoints
    Else
    {
    ADD Leg Start WPT, Leg End WPT and Broken up
        Segment WPTS to TempWPTList
    Update NumberOfTempWaypoints
    }
}
{
```

Figure 5:
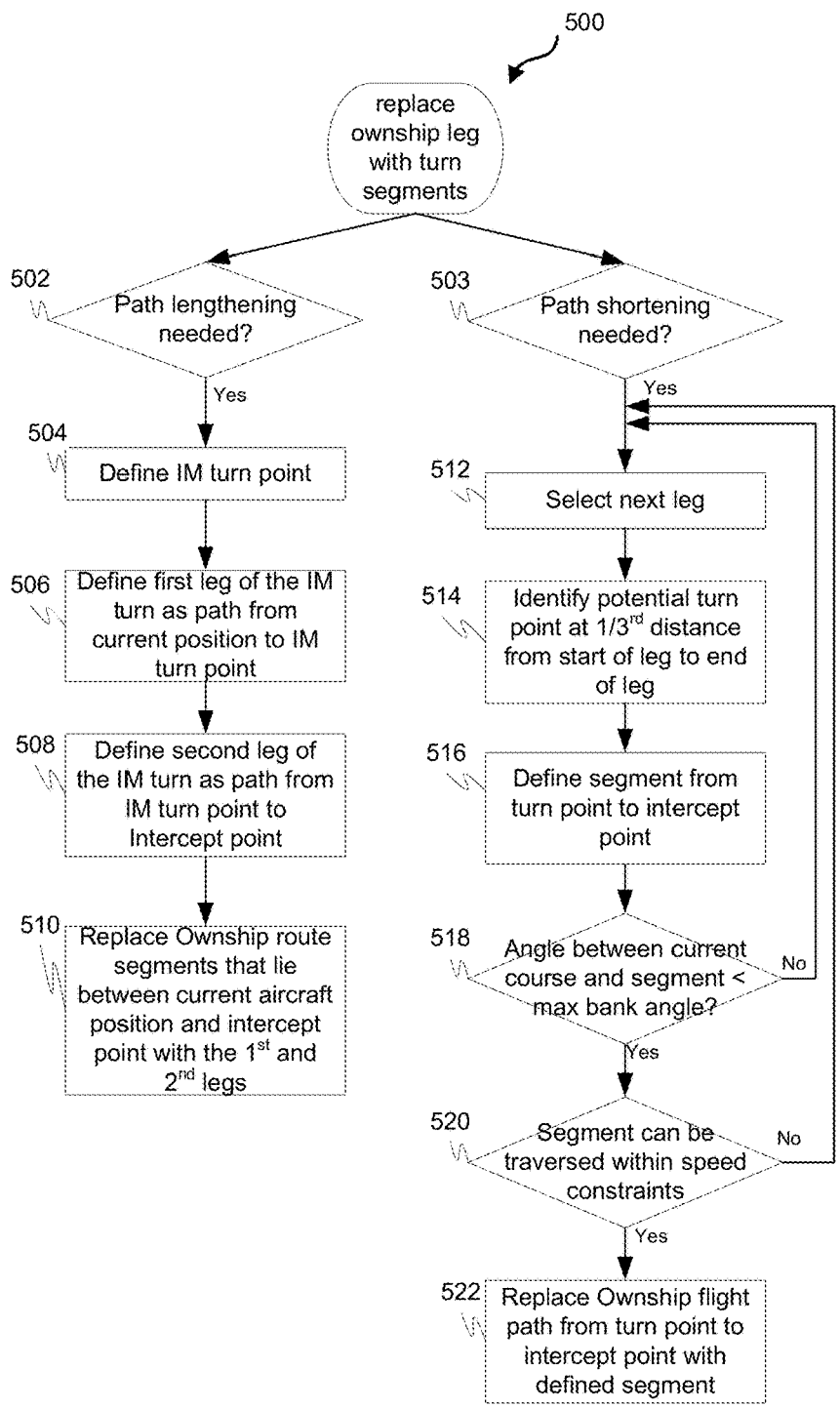
FIG. 5 is a process flowchart depicting an example process for replacing a selected ownship route leg with one or more interposed turn segments, in accordance with some embodiments.

FIG. 5 is a process flowchart depicting an example process 500 for replacing a selected ownship route leg with one or more interposed turn segments. Example process 500 is provided as an example of operation 230 in example process 200. An ownship route leg may be replaced with one or more interposed turn segments. This may result from an IM turn procedure specified in the IM message or it may be determined based on the relative distance of the ownship and target aircraft to an intercept or reach-by-point.

If path lengthening is needed (yes at decision 502), an IM turn point is defined (operation 504). The first leg of the IM turn is defined as the path from the current ownship position to the IM turn point (operation 506). The second leg of the IM turn is defined as the path from the IM turn point to the intercept point (operation 508). The ownship route segments that lie between the current aircraft position and the intercept point are replace with the defined first and second legs (operation 510).

If path shortening is needed (yes at decision 503), the next leg is selected (operation 512). In the leg, a potential turn point at one third of the distance from the start of the leg to the end of the leg is identified (operation 514). A segment from this potential turn point to the intercept point is defined (operation 516). A determination is made regarding whether the angle between the current course and the segment is less than the maximum allowable bank angle (decision 518). If the angle is less than the maximum allowable bank angle (yes at decision 518), a determination is made regarding whether the segment can be traversed by the ownship aircraft within speed constraints (decision 520). If the segment can be traversed by the ownship aircraft within speed constraints (yes at decision 520), the ownship flight path is replaced from the potential turn point to the intercept point with the defined segment (operation 522). If the answer to either decision 518 or decision 520 is no, then the process resumes with selecting a next leg for evaluation (operation 512).

Figure 6:
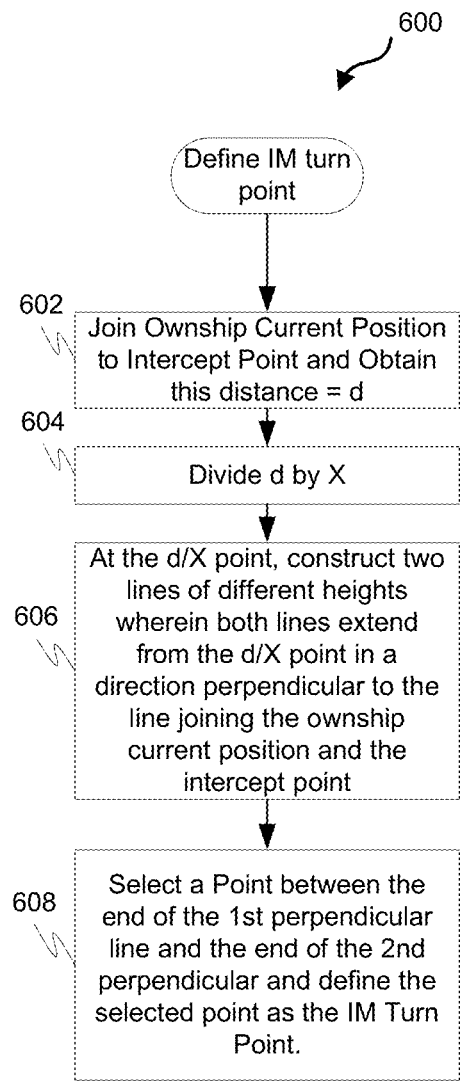
FIG. 6 is a process flowchart depicting an example process for defining an IM turn point.

FIG. 6 is a process flowchart depicting an example process 600 for defining an IM turn point. Example process 600 is provided as an example of operation 504 in example process 500. If path lengthening is needed, an IM turn point is defined. As illustrated in FIG. 7B, example process 600 may involve defining a straight path 720 joining the current ownship position 722 to an intercept point 724 and obtaining the distance=d between the two points 722, 724 (operation 602). The distance d is divided by X (e.g., X=2 or 3) (operation 604). At the d/X point 726 on the path 720, two lines 728, 730 of different heights are constructed wherein both lines extend from the d/X point 726 in a direction perpendicular to the path 720 joining the ownship current position 722 and the intercept point 724 (on the outward side) wherein the height of a first line 728 of the perpendicular lines is chosen such that the angle 732 between the path 720 joining the ownship current position 722 and the intercept point 724 and a line 734 from the ownship current position 722 to the end of the 1st perpendicular line 728 corresponds to minimum bank angle turn that the ownship can perform and the height of the second line 730 of the perpendicular lines is chosen such that the angle 736 between the path 720 joining the ownship current position 722 and the intercept point 724 and a line 738 from the ownship current position 722 to the end of the 2nd perpendicular line 738 corresponds to maximum bank angle turn that the ownship can perform (operation 606). A point 740 between the end of the first perpendicular line 728 and the end of the second perpendicular line 730 is selected and is defined as the IM turn point 740 (operation 608).

Listed below is an example algorithm for replacing a selected ownship route leg with one or more interposed turn segments.

```
If Target Aircraft Linearized Route Longer than Ownship
{
    /* Case for Need of Path Lengthening on Ownship, See
        FIG. 7B*/
    Perform the following computation:
    Join Ownship Current Position to Intercept Point and
        Obtain this distance=d
    Divide d by X (e.g., X=2 or 3)
    At the d/X point, construct two lines of different heights
        wherein both lines extend from the d/X point in a
        direction perpendicular to the line joining the ownship
        current position and the intercept point (on the outward
        side) wherein the height of one of the perpendicular
        lines is chosen such that the angle between the line
        joining the ownship current position and the intercept
        point and a line from the ownship current position to
        the end of the 1st perpendicular line corresponds to Min
        Bank angle Turn that the Aircraft can perform and the
        height of the second of the perpendicular lines is
        chosen such that the angle between the line joining the
        ownship current position and the intercept point and a
        line from the ownship current position to the end of the
        2nd perpendicular line corresponds to Max Bank angle
        Turn that the Aircraft can perform
    Select a Point between the end of the 1st perpendicular
        line and the end of the 2nd perpendicular and define the
        selected point as the IM Turn Point. Obtain Coordinates
        of this IM Turn Point
    Join Aircraft Current Position to IM Turn Point to obtain
        the first Leg of the IM Turn
```

Join IM Turn Point to Intercept Point to obtain second Leg of IM Turn

Replace Ownship Route Segments that lie between Current Aircraft Position and Intercept Point with the first and second legs of the IM Turn. The Interposed Turn Segment is the composition of the first and second legs.
}
Else
{
/* Case for Need of Path Shortening on Ownship See FIG. 7C */

Repeat the following for every segment taking Min and Max Bank Angle of Aircraft (starting with the Min Bank Angle), and checking whether the aircraft has enough time to cover the distance at the speed constrained on the segment. If this condition is satisfied, we stop the computation. The Interposed segment so obtained is the one to be used further in the Linearize process.

Start at the Current Leg

Take 1/Y (e.g., Y=3) of the segment Length and join the 1/Y Segment Length to the Intercept Point. Check whether the angle between this Joined segment and current course is less than Max Bank angle. If so Check if 1/Y Segment length can be covered in the speed Constrained for this segment. If both these conditions are met, then the IM Turn Point can be at the 1/Y Point. The Interposed Turn Segment is the Line joining the 1/Y point on the Current Leg with the Intercept Point.

If the above Checks on the 1/Y segment length of the current Leg do not pass, perform the same checks on the next Leg. Obtain the Interposed Turn Segment in a manner similar to that described above.
}

Figure 7A:
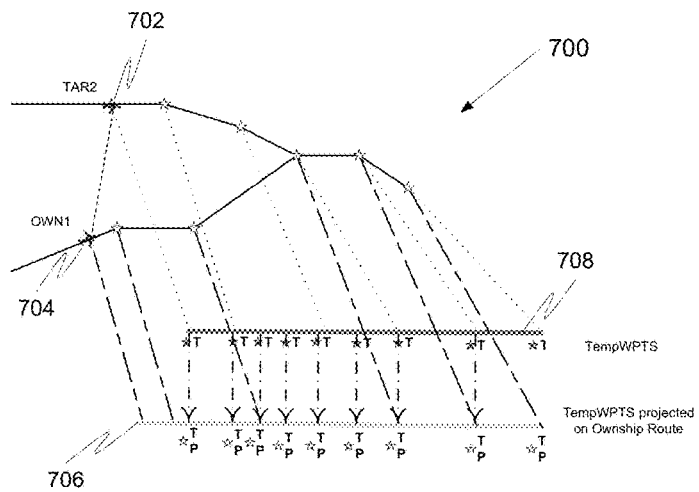
FIG. 7A is a diagram depicting an example linearization of an example flight path for a target aircraft and an ownship aircraft, in accordance with some embodiments.
Figure 7B:
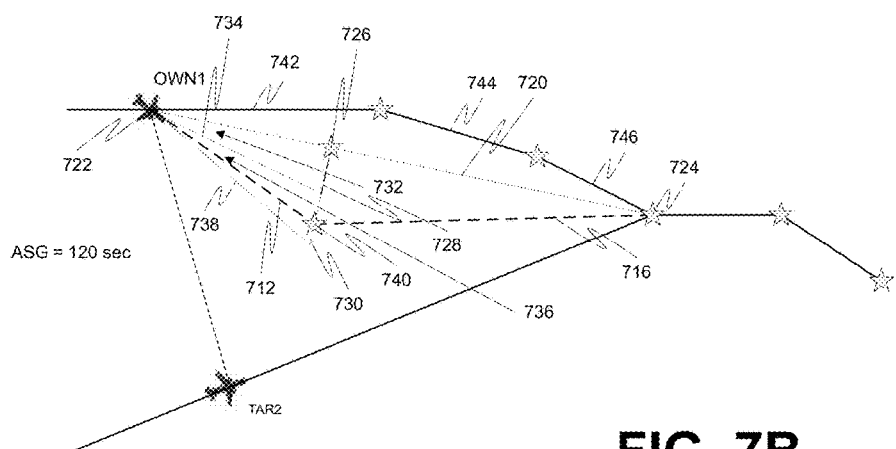
FIG. 7B is a diagram depicting an example path lengthening of an example flight path for an ownship aircraft to facilitate the completion of an IM turn procedure, in accordance with some embodiments.

FIG. 7A is a diagram depicting an example linearization of an example flight path 700 for a target aircraft 702 and an ownship aircraft 704. Waypoints from the ownship route are projected onto the linearized flight path 706 of the ownship aircraft. Waypoints from the target aircraft route are projected onto the linearized flight path 708 of the target aircraft as temporary waypoints *T. The temporary waypoints *T are projected onto the linearized flight path 706 of the ownship aircraft as temporary projected waypoints *TP.

FIG. 7B is a diagram depicting an example path lengthening of an example flight path for an ownship aircraft OWN1 to facilitate the completion of an IM turn procedure. An IM turn point 740 is defined. The first leg 712 of an IM turn is defined as the path from the current ownship position 722 to the IM turn point 740. The second leg 716 of the IM turn is defined as the path from the IM turn point 722 to the intercept point 724. The ownship route segments 742, 744, 746 that lie between the current aircraft position 722 and the intercept point 724 are replaced with the defined first leg 712 and second leg 716.

Figure 7C:
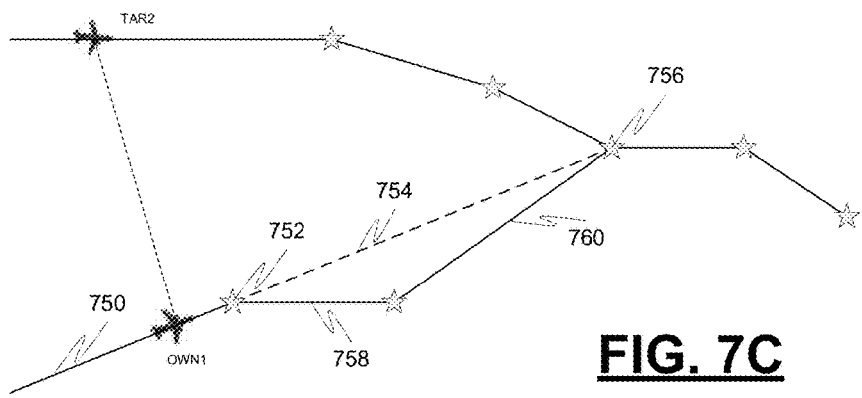
FIG. 7C is a diagram depicting an example path shortening of an example flight path for an ownship aircraft to facilitate the completion of an IM turn procedure, in accordance with some embodiments.

FIG. 7C is a diagram depicting an example path shortening of an example flight path for an ownship aircraft OWN1 to facilitate the completion of an IM turn procedure. The next leg 750 is selected. In the leg, a potential turn point 752 at 1/Y (e.g., Y=3) of the distance from the start of the leg to the end of the leg is identified. A segment 754 from this potential turn point 752 to the intercept point 756 is defined. Because, in this example, the angle between the current course and the segment is less than the maximum allowable bank angle and because, in this example, the segment 754 can be traversed by the ownship aircraft OWN1 within speed constraints, the ownship flight path from the potential turn point 752 to the intercept point 756 (i.e., legs 758, 760) is replaced with the defined segment 754.

Figure 8:
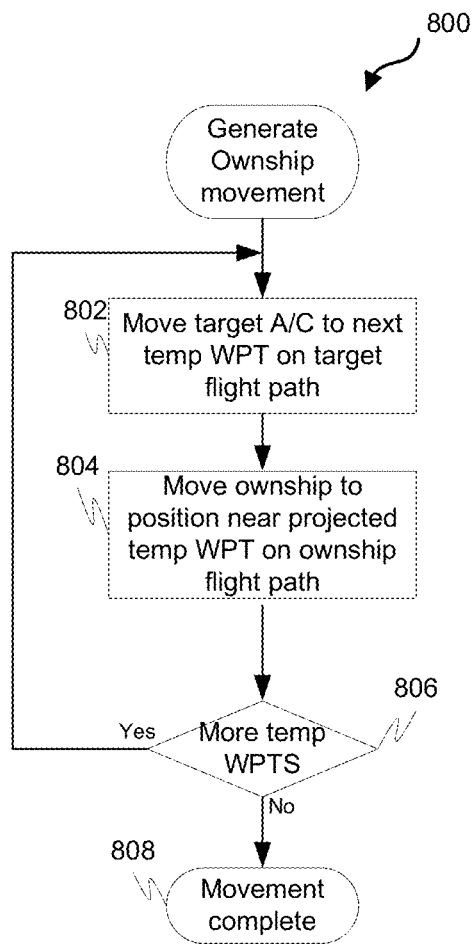
FIG. 8 is a process flowchart depicting an example process for simulating the movement of the ownship aircraft during a simulation of the IP procedure, in accordance with some embodiments.

FIG. 8 is a process flowchart depicting an example process 800 for simulating the movement of the ownship aircraft during a simulation of the IM procedure. The target aircraft is moved to the next temp waypoint on the target flight path (operation 802). The ownship aircraft is moved to a position near a projected temporary waypoint on the ownship flight path (operation 804). The position to which the ownship aircraft is moved includes the spacing required by the IM message plus any error that has now yet been corrected between the desired spacing and the current spacing. The example process 800 steps through the movement of the target aircraft and ownship aircraft one temporary waypoint at a time. If more temporary waypoints are remaining (yes at decision 806), the example process 800 continues to step through the movement of the target aircraft and ownship aircraft. If no more temporary waypoints are remaining (no at decision 806), movement is complete (operation 808).

Listed below is an example algorithm for simulating the movement of the ownship during an IM procedure.

```
PercentOwnshipErrorToMakeupAtEachTempWPT = 100/NumberOfTempWaypoints /*SEE NOTE BELOW**/
AccumulatedPercentOwnshipError = 0
For (NumberOfTempWaypoints)
{
  AccumulatedPercentOwnshipError = AccumulatedPercentOwnshipError + PercentOwnshipErrorToMakeupAtEachTempWPT
  Move Target aircraft to a TempWPT on Target Aircraft Route
  Whenever Target Aircraft is moved to a TempWPT on the Target Aircraft Route
  {
    DeltaErrorForCurrentTempWPT = [100 – AccumulatedPercentOwnshipError]
    Move Ownship on Ownship Route as follows:
      Ownship Distance on Ownship Route LAT PATH = Projected Target TempWPT on Ownship Route -
        AssignedSpacingGoal + (DeltaErrorForCurrentTempWPT * AssignedSpacingGoal)
      Ownship Point on VERT PATH is the projection of the Plan View Point onto the Vertical Path
  }
}
```

/*NOTE **/ The PercentOwnshipErrorToMakeupAtEachTempWPT may be set differently (say initially less aggressive and progressively more aggressive by application of a suitable sub-algorithm)

One Exemplar sub-algorithm may capture tile spacing error as a percentage of the 'p'(p=3 in this case) intervals {10-20, 20-60, 60-100} distributed across the route till ABP in phased manner.

Figures 9A, 9B:
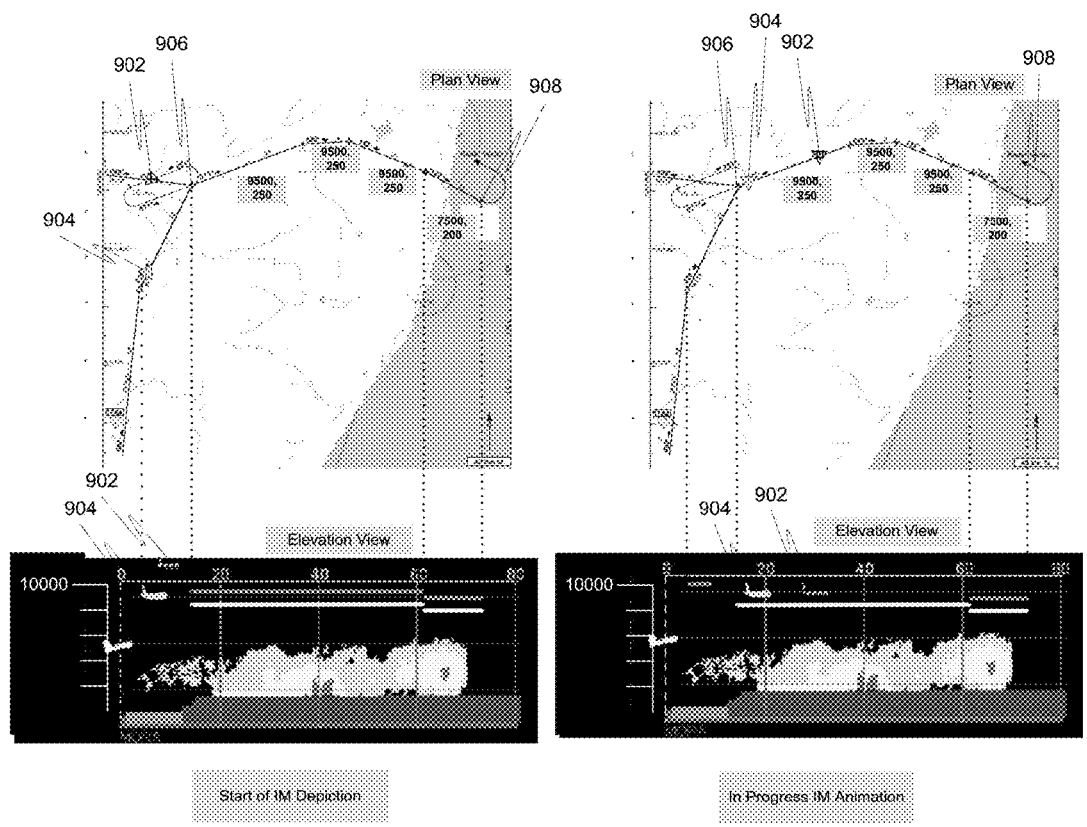
FIGS. 9A and 9B, respectively, depict an example animation display at the start of an example IM procedure animation and in progress during the example IM procedure animation, in accordance with some embodiments.

FIGS. 9A and 9B, respectively, depict an example animation display at the start of an example IM procedure animation and in progress during the example IM procedure animation. Depicted are both a plan view and an elevation view. A target aircraft 902 and an ownship aircraft 904 are both depicted in the plan views and the vertical views. In FIG. 9A, both the target aircraft 902 and the ownship aircraft 904 are directed toward an achieve-by point 906 in the flight path of both aircrafts, which is the waypoint at which the flight path of each aircraft should join. In FIG. 9B, the ownship aircraft 904 is following the target aircraft 902 using the spacing specified in the IM clearance message. Along with other waypoints, also shown is a planned termination point 908, which is the waypoint at which the IM procedure may terminate.

Described herein are techniques for allowing a flight crew to preview an IM clearance message graphically using an animated sequence and understand the clearance message before accepting it. The techniques can provide the ability to visualize how the IM procedure will execute in relation to STAR/transition charts in both the plan and vertical views. The techniques can provide for the integration of both voice and datalink based IM clearances into the same system. The techniques can provide the ability to visualize complex IM clearances involving turns. The techniques can result in a reduction of the flight crew's mental workload during IM execution.

In one embodiment, a method of simulating an interval management (IM) procedure for an ownship aircraft and a target aircraft before the start of the performance of the IM procedure is provided. The method comprises receiving an IM clearance message from air traffic control (ATC), parsing the received IM clearance message into parsed information components comprising mapping information identifying the area over which the IM procedure is to traverse, flight information for the ownship aircraft and the target aircraft for the IM procedure that includes the intended flight path and current speeds for each of the ownship aircraft and the target aircraft, and maneuver information that identifies one or more maneuver types to be made by the ownship aircraft to execute the proposed IM procedure. The method further comprises identifying the complexity of the IM clearance message based on the number of elements in the information components, generating a flight chart depicting the area over which the proposed IM procedure is to traverse using the mapping information wherein the flight chart includes a vertical view and a plan view, and simulating the IM procedure on the generated flight chart before any steps of the IM procedure are performed. Simulating the IM procedure comprises positioning the ownship aircraft and the target aircraft at a starting point in an animation of the flight chart using the flight information, decoding the merge point in the animation of the movement of the ownship aircraft and the target aircraft on the flight chart using the maneuver information, generating vertical path display information for both the ownship aircraft and the target aircraft on the vertical view of the flight chart, and animating the movement of the ownship aircraft and the target aircraft in the animation on both the elevation and plan views of the flight chart. The method further comprises displaying the animation on both the plan and elevation views to the flight crew.

These aspects and other embodiments may include one or more of the following features. Receiving an IM clearance message may comprise receiving the IM clearance message through a voice message or a digital data link and converting the voice message to text and performing a secondary check to verify the accuracy of the conversion to text when the IM clearance message is a voice message. The method may further comprise providing an option to alert the flight crew that an IM clearance message can be previewed via an animation when the identified complexity of the IM clearance message is at a predetermined level. The maneuver information may include any of a capture then maintain maneuver, an achieve-by then maintain maneuver, a final approach spacing maneuver, and an IM turn maneuver, and may include any of an achieve-by point, an intercept point, and a planned termination point. The maneuver information may include the current spacing goal between the ownship aircraft and the target aircraft. The flight chart may provide an option to include wind profile data. Displaying the animation may comprise displaying the animation with options to zoom-in and zoom-out into individual flight legs to obtain more information on speed, altitude, time restrictions, waypoints, fixes, or leg information. Displaying the animation may comprise displaying the animation with an option for color coding based on the speed gradient, the number of speed commands, the extent of deceleration and the extent of acceleration. Animating the movement of the ownship aircraft and the target aircraft may comprise linearizing target aircraft route and defining temporary waypoints for each leg, linearizing ownship route and projecting temporary waypoints of target aircraft onto ownship route, moving the target aircraft along temporary waypoints on target flight path, and moving the ownship aircraft along projected temporary waypoints on ownship route with a spacing error that is reduced in a progressive manner and wherein the progressive reduction of the spacing error may not be evenly split between the projected temporary waypoints. Animating the movement of the ownship aircraft and the target aircraft may further comprise replacing selected ownship route legs with one or more interposed turn segments.

In another embodiment, provided is an interval management (IM) clearance system configured to aid a flight crew on an ownship aircraft in deciding whether to accept or reject an IM clearance message by providing an animation of an IM procedure for the ownship aircraft and a target aircraft identified in the IM clearance message that the ownship aircraft is to follow during the execution of the IM procedure. The system comprises a receiver in the ownship aircraft configured to receive an IM clearance message and a parser configured to parse the received IM clearance message into parsed information components. The parsed information components comprise mapping information identifying the area over which the IM procedure is to traverse, flight information for the ownship aircraft and the target aircraft for the IM procedure that includes the intended flight path and current speeds for each of the ownship aircraft and the target aircraft, and maneuver information that identifies one or more maneuver types to be made by the ownship aircraft to execute the proposed IM procedure. The system further comprises a flight chart generator configured to receive the mapping information and based on the received mapping information generate a flight chart depicting the area over which the proposed IM procedure is to traverse using the mapping information wherein the flight chart includes a vertical view and a plan view. The system further comprises a flight path renderer configured to position the ownship aircraft and the target aircraft at a starting point in an animation of the flight chart using the flight information, a merge type evaluator configured to decode the merge point in the animation of the movement of the ownship aircraft and the target aircraft on the flight chart using the maneuver information, a vertical situation view generator configured to generate vertical path display information for both the ownship aircraft and the target aircraft on the vertical view of the flight chart, an IM procedure animator configured to animate the movement of the ownship aircraft and the target aircraft in the animation on both the elevation and plan views of the flight chart, and a display system configured to display the animation on both the plan and elevation views to the flight crew.

These aspects and other embodiments may include one or more of the following features. The receiver may be configured to receive an IM clearance message through a voice message or a digital data link. The system may further comprise a voice to text converter configured to convert the voice message to text and a voice to text conversion validator configured to verify the accuracy of the conversion to text. The maneuver information may comprise any of a capture then maintain maneuver, an achieve-by then maintain maneuver, a final approach spacing maneuver, and an IM turn maneuver, and may comprise any of an achieve-by point, an intercept point, and a planned termination point. The maneuver information may include the current spacing goal between the ownship aircraft and the target aircraft. The flight chart may provide an option to include wind profile data. The system may further comprise an option to re-review the IM clearance at another time. The display system may be further configured with an option to select the plan and vertical views. The display system may be further configured with an option to zoom-in and zoom-out into individual flight legs to obtain more information on speed, altitude, or time restrictions. Displaying the animation may include an option for color coding based on the speed gradient, the number of speed commands, the extent of deceleration, and the extent of acceleration. The IM procedure animator may be configured to animate the movement of the ownship aircraft and the target aircraft in the animation by linearizing the target aircraft route and defining temporary waypoints for each leg, linearizing the ownship route and projecting temporary waypoints of target aircraft onto the ownship route, moving the target aircraft along temporary waypoints on target flight path, moving the ownship aircraft along projected temporary waypoints on the ownship route, and replacing selected ownship route legs with one or more interposed turn segments.

In another embodiment, provided is an interval management (IM) clearance system configured to aid a flight crew on an ownship aircraft in deciding whether to accept or reject an IM clearance message by providing an animation of an IM procedure for the ownship aircraft and a target aircraft identified in the IM clearance message that the ownship aircraft is to follow during the execution of the IM procedure. The system comprises one or more processors and non-transient computer readable media coupled to the one or more processors wherein the non-transient computer readable media embodies programming instructions configurable to perform a method. The method comprises receiving an IM clearance message from air traffic control (ATC) and parsing the received IM clearance message into parsed information components. The parsed information components comprise mapping information identifying the area over which the IM procedure is to traverse, flight information for the ownship aircraft and the target aircraft for the IM procedure that includes the intended flight path and current speeds for each of the ownship aircraft and the target aircraft, and maneuver information that identifies one or more maneuver types to be made by the ownship aircraft to execute the proposed IM procedure. The method further comprises identifying the complexity of the IM clearance message based on the number of elements in the information components, generating a flight chart depicting the area over which the proposed IM procedure is to traverse using the mapping information wherein the flight chart includes a vertical view and a plan view, and simulating the IM procedure on the generated flight chart before any steps of the IM procedure are performed. Simulating the IM procedure comprises positioning the ownship aircraft and the target aircraft at a starting point in an animation of the flight chart using the flight information, decoding the merge point in the animation of the movement of the ownship aircraft and the target aircraft on the flight chart using the maneuver information, generating vertical path display information for both the ownship aircraft and the target aircraft on the vertical view of the flight chart, animating the movement of the ownship aircraft and the target aircraft in the animation on both the elevation and plan views of the flight chart, and displaying the animation on both the plan and elevation views to the flight crew.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention if such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of simulating an interval management (IM) procedure for an ownship aircraft and a target aircraft before the start of the performance of the IM procedure, the method comprising:
   receiving an IM clearance message from air traffic control (ATC);
   parsing the received IM clearance message into parsed information components comprising:
      mapping information identifying the area over which the IM procedure is to traverse;
      flight information for the ownship aircraft and the target aircraft for the IM procedure that includes the intended flight path and current speeds for each of the ownship aircraft and the target aircraft; and
      maneuver information that identifies one or more maneuver types to be made by the ownship aircraft to execute the proposed IM procedure;
   identifying the complexity of the IM clearance message based on the number of elements in the information components;
   generating a flight chart depicting the area over which the proposed IM procedure is to traverse using the mapping information, the flight chart including a vertical view and a plan view;
   simulating the IM procedure on the generated flight chart before any steps of the IM procedure are performed, simulating the IM procedure comprises:
      positioning the ownship aircraft and the target aircraft at a starting point in an animation of the flight chart using the flight information;
      decoding the merge point in the animation of the movement of the ownship aircraft and the target aircraft on the flight chart using the maneuver information;
      generating vertical path display information for both the ownship aircraft and the target aircraft on the vertical view of the flight chart;
      animating the movement of the ownship aircraft and the target aircraft in the animation on both the elevation and plan views of the flight chart; and
   displaying the animation on both the plan and elevation views to the flight crew.

2. The method of claim 1, wherein receiving an IM clearance message comprises:
   receiving the IM clearance message through a voice message or a digital data link; and
   converting the voice message to text and performing a secondary check to verify the accuracy of the conversion to text when the IM clearance message is a voice message.

3. The method of claim 1, further comprising providing an option to alert the flight crew that an IM Clearance Message can be previewed via an animation when the identified complexity of the IM clearance message is at a predetermined level.

4. The method of claim 1, wherein the maneuver information comprises:
   any of a capture then maintain maneuver, an achieve-by then maintain maneuver, a final approach spacing maneuver, and an IM turn maneuver; and
   any of an achieve-by point, an intercept point, and a planned termination point.

5. The method of claim 4, wherein the maneuver information includes the current spacing goal between the ownship aircraft and the target aircraft.

6. The method of claim 1, wherein the flight chart provides an option to include wind profile data.

7. The method of claim 1, wherein displaying the animation comprises displaying the animation with options to zoom-in and zoom-out into individual flight legs to obtain more information on speed, altitude, time restrictions, waypoints, fixes, or leg information.

8. The method of claim 1, wherein displaying the animation comprises displaying the animation with an option for color coding based on the speed gradient, the number of speed commands, the extent of deceleration and the extent of acceleration.

9. The method of claim 1, wherein animating the movement of the ownship aircraft and the target aircraft comprises:
   linearizing target aircraft route and defining temporary waypoints for each leg;
   linearizing ownship route and projecting temporary waypoints of target aircraft onto ownship route;
   moving the target aircraft along temporary waypoints on target flight path; and moving the ownship aircraft along projected temporary waypoints on ownship route with a spacing error that is reduced in a progressive manner and wherein the progressive reduction of the spacing error may not be evenly split between the projected temporary waypoints.

10. The method of claim 9, wherein animating the movement of the ownship aircraft and the target aircraft further comprises:
replacing selected ownship route legs with one or more interposed turn segments.

11. An interval management (IM) clearance system configured to aid a flight crew on an ownship aircraft in deciding whether to accept or reject an IM clearance message by providing an animation of an IM procedure for the ownship aircraft and a target aircraft identified in the IM clearance message that the ownship aircraft is to follow during the execution of the IM procedure, the system comprising:
a receiver in the ownship aircraft configured to receive an IM clearance message;
a parser configured to parse the received IM clearance message into parsed information components comprising:
mapping information identifying the area over which the IM procedure is to traverse;
flight information for the ownship aircraft and the target aircraft for the IM procedure that includes the intended flight path and current speeds for each of the ownship aircraft and the target aircraft; and
maneuver information that identifies one or more maneuver types to be made by the ownship aircraft to execute the proposed IM procedure;
a flight chart generator configured to receive the mapping information and based on the received mapping information generate a flight chart depicting the area over which the proposed IM procedure is to traverse using the mapping information, the flight chart including a vertical view and a plan view, the flight chart providing an option to include wind profile data;
a flight path renderer configured to position the ownship aircraft and the target aircraft at a starting point in an animation of the flight chart using the flight information;
a merge type evaluator configured to decode the merge point in the animation of the movement of the ownship aircraft and the target aircraft on the flight chart using the maneuver information;
a vertical situation view generator configured to generate vertical path display information for both the ownship aircraft and the target aircraft on the vertical view of the flight chart;
an IM procedure animator configured to animate the movement of the ownship aircraft and the target aircraft in the animation on both the elevation and plan views of the flight chart; and
a display system configured to display the animation on both the plan and elevation views to the flight crew.

12. The system of claim 11, wherein the receiver is configured to receive an IM clearance message through a voice message or a digital data link.

13. The system of claim 12, further comprising:
a voice to text converter configured to convert the voice message to text; and
a voice to text conversion validator configured to verify the accuracy of the conversion to text.

14. The system of claim 11, wherein the maneuver information comprises:

any of a capture then maintain maneuver, an achieve-by then maintain maneuver, a final approach spacing maneuver, and an IM turn maneuver; and
any of an achieve-by point, an intercept point, and a planned termination point.

15. The system of claim 14, wherein the maneuver information includes the current spacing goal between the ownship aircraft and the target aircraft.

16. The system of claim 11, further comprising an option to re-review the IM clearance at another time.

17. The system of claim 11, wherein the display system is further configured with an option to select the plan and vertical views.

18. The system of claim 11, wherein displaying the animation includes an option for color coding based on the speed gradient, the number of speed commands, the extent of deceleration and the extent of acceleration.

19. The system of claim 11, wherein the IM procedure animator is configured to animate the movement of the ownship aircraft and the target aircraft in the animation by:
linearizing target aircraft route and defining temporary waypoints for each leg;
linearizing ownship route and projecting temporary waypoints of target aircraft onto ownship route;
moving the target aircraft along temporary waypoints on target flight path;
moving the ownship aircraft along projected temporary waypoints on ownship route; and
replacing selected ownship route legs with one or more interposed turn segments.

20. An interval management (IM) clearance system configured to aid a flight crew on an ownship aircraft in deciding whether to accept or reject an IM clearance message by providing an animation of an IM procedure for the ownship aircraft and a target aircraft identified in the IM clearance message that the ownship aircraft is to follow during the execution of the IM procedure, the system comprising one or more processors and non-transient computer readable media coupled to the one or more processors, the non-transient computer readable media embodying programming instructions configurable to perform a method, the method comprising:
receiving an IM clearance message from air traffic control (ATC);
parsing the received IM clearance message into parsed information components comprising:
mapping information identifying the area over which the IM procedure is to traverse;
flight information for the ownship aircraft and the target aircraft for the IM procedure that includes the intended flight path and current speeds for each of the ownship aircraft and the target aircraft; and
maneuver information that identifies one or more maneuver types to be made by the ownship aircraft to execute the proposed IM procedure;
identifying the complexity of the IM clearance message based on the number of elements in the information components;
generating a flight chart depicting the area over which the proposed IM procedure is to traverse using the mapping information, the flight chart including a vertical view and a plan view; and
simulating the IM procedure on the generated flight chart before any steps of the IM procedure are performed, simulating the IM procedure comprises:

positioning the ownship aircraft and the target aircraft at a starting point in an animation of the flight chart using the flight information;

decoding the merge point in the animation of the movement of the ownship aircraft and the target aircraft on the flight chart using the maneuver information;

generating vertical path display information for both the ownship aircraft and the target aircraft on the vertical view of the flight chart;

animating the movement of the ownship aircraft and the target aircraft in the animation on both the elevation and plan views of the flight chart; and displaying the animation on both the plan and elevation views to the flight crew.

\* \* \* \* \*